April 23, 1963   D. J. REYNOLDS ETAL   3,086,498
CAGE STRUCTURE
Filed Nov. 30, 1961
Fig. 1
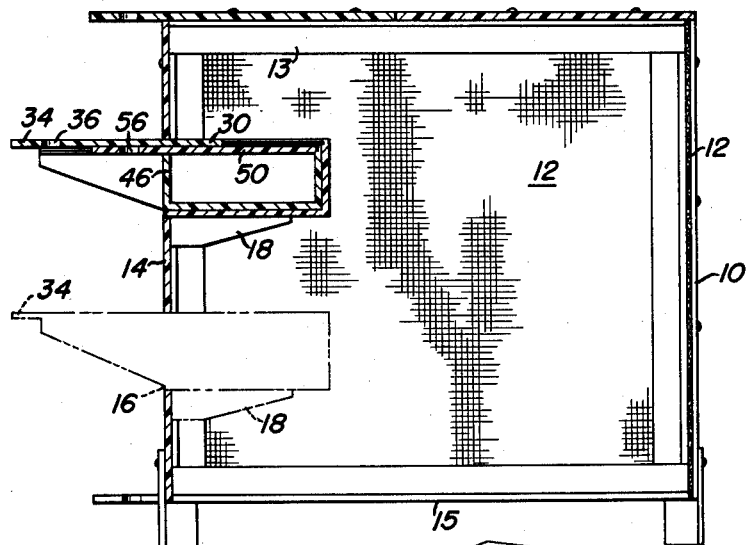
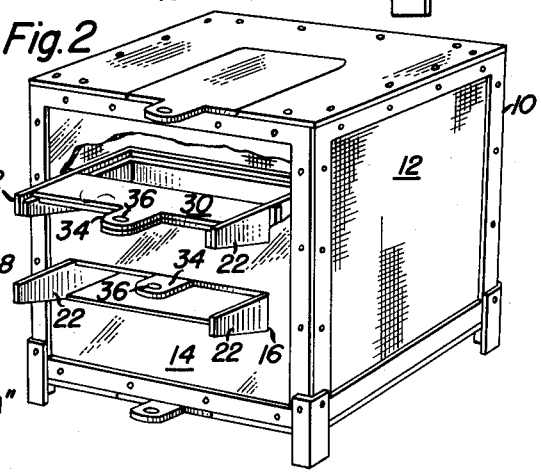
Fig. 3
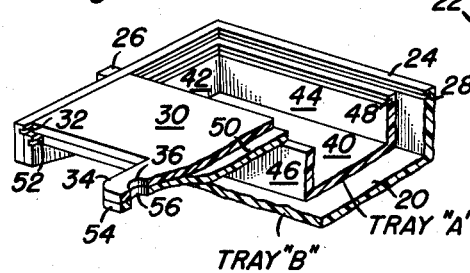
Fig. 4
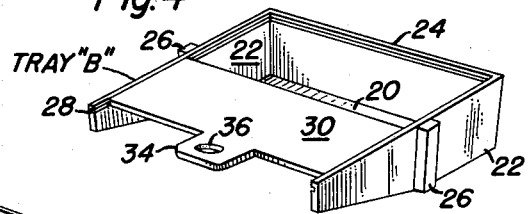
Fig. 5
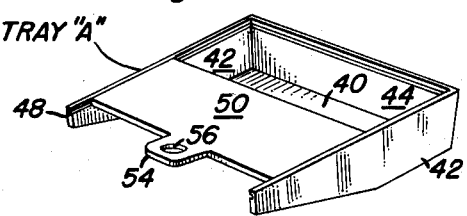
INVENTORS
Harold R. Cunningham
Daniel J. Reynolds
BY George Renehan
ATTORNEY 3,086,498
CAGE STRUCTURE
Daniel J. Reynolds, Cleveland, Ohio (37 Medical Co. (Punt Med.) (Sep.), APO 301, San Francisco, Calif.), and Harold R. Cunningham, 100 W. Warfield Drive, Mount Airy, Md.
Filed Nov. 30, 1961, Ser. No. 156,179
3 Claims. (Cl. 119—17)
(Granted under Title 35, U.S. Code (1952), sec. 266)

The invention described herein may be manufactured and used by or for the Government of the United States of America for governmental purposes without the payment to us of any royalty thereon.

This invention relates to an escape proof and hazard proof device which permits the insertion and removal of objects and materials from a cage containing flying animals such as insects, birds, bats and the like which may be venomous or infectious.

The device consists of an arrangement of nesting trays which are mounted in the front or sides of colonization or holding cages. Sliding drawers and a minimum fit between these drawers prevent escapes.

Its principal application is in insect colonization and holding cages in inserting pupae, feeding emerged adults, and in egg production. Being escape proof insect carriers of infectious diseases can be studied without hazard to the operator, and investigations into species and strain can be conducted without danger of cross breeding.

Where used in conjunction with a flexible glove insert this device will permit the introduction of tools and instruments into the cage. As an example, forceps or tweezers could be introduced into the cage to pick up an insect or object to be placed in the tray for removal and examination.

In the drawings,

FIG. 1 discloses a side elevational view with the trays inserted in the cage, the lower trays being shown in phantom view.

FIG. 2 discloses a front isometric view of the cage and drawers drawn to a reduced scale.

FIG. 3 discloses a cutaway view of the two drawers together, one within the other.

FIG. 4 shows an isometric view of tray B drawn to a reduced scale.

FIG. 5 shows an isometric view of tray A drawn to a reduced scale.

It is seen from the drawings that cage 10 comprises screen side panels 12, a top 13, a transparent plastic front panel 14, and a bottom 15. The front panel has rectangular openings 16 for inserting trays B and A. Two or more support bars 18 are placed to support the inner portions of the trays.

Tray B, the outer tray, comprises a floor 20, sides 22, a rear 24, stop lugs 26 which have been placed on sides 22 to prevent the tray from sliding completely within the cage. A groove 28 is situated near the upper portion of the sides 22 and rear 24. A sliding lid 30 with a groove insert 32 extends along its side and rear portions for engagement with the groove 28 to insure a complete seal when closed. A locking device which consists of tab 34 with a hole 36 is placed in the center and front portion of the slide 30 in order that the tray be locked in position in the cage with a lock bar (not shown).

Tray A, the inner and slightly smaller tray, comprises a floor 40, sides 42, rear 44, front 46, groove 48, and has a sliding lid 50, groove insert 52, tab 54 with a hole 56. It is structurally identical with tray B with the exception that it is smaller and it has a front 46 but no stop lugs 26. FIG. 3 discloses the trays together with the tray A within the tray B and with the lids 30 and 50 in the forward position.

The operation of our device will now be explained in detail.

Tray A is used to introduce objects into, or remove objects from the cage. An object is placed in tray A and the lid is closed. Tray A is then inserted into tray B which is already sitting within the cage having its lid in the closed position. Both lids are then opened as shown in FIG. 2 so that the object can be made accessible to the interior of the cage. The insects can enter the tray from the cage in order to reach the object which in many cases will be food or water.

To remove tray A both lids are closed and the tray is withdrawn. Any insects trapped in tray A can be killed by standard procedures before the lid is opened.

The device has many applications such as feeding, oviposition of eggs, and behavior studies. By subdividing tray A alternate attractants of food could be provided. Liquid soaked materials for the oviposition of eggs could be changed daily, and heating or lighting elements could be added to tray A for studies associated with thermotropic or phototropic response. Sensing elements could be added for various readings such as temperature and pH.

The device has many advantages. It can be placed in any position in the cage and modified as to size to permit its use for most caged animals.

Since the device is escape proof and tray A can be conveniently removed for a change of contents or cleaning, a number of disadvantages associated with animals such as flying insects are eliminated.

In the usual exterior feeding method, moistened organic materials are placed in the cage top or strapped in place on the cage side. The organic materials react chemically with the cage wall and over a period of time corrosion may occur. These moistened materials can drip through the cage and create an unsightly and unsanitary condition. Fungus and toxic materials may develop in the fermenting or putrifying organic matter. Sticky substances may drip on the cage floor and entrap the cage members. In other methods which utilize containers holding this organic matter, placed into and removed from the cage through such devices as sleeve openings, there is a good possibility of having escapees and also the hazard of exposing the cage operator to bites. This device permits the cage operator to frequently and conveniently introduce and remove materials into the cage without escapees or exposure to bites. The cage walls remain clean and sanitary. There is no entrapment of insects such as mosquitoes in dripping sugar syrup.

With the provision of locking devices and interlocks between trays A and B and the two lids, the possibility of escapes through operator error would be precluded.

We have constructed a similar device utilizing a circular tray with two 270° sliding lids which was also tested successfully. However, the device was more complicated in design and required more skill in its operation. The rectangular tray device is extremely simple to make and to use.

We claim:

1. In an animal cage, an escape proof device which allows ingress and egress to and from the interior of said cage which comprises at least one solid wall fixed to said cage having an opening therein, support means attached to said wall below said opening and which extend into the interior of said cage, outer means slidably positioned within said opening and resting on said support means, an inner means slidably positioned within and held by said outer means and where said outer means comprises an outer slidable drawer having a removable cover which can enclose the top portion of said drawer.

2. The animal cage of claim 1 wherein the inner means comprises an inner slidable drawer having a slidable cover which can enclose the top portion of said drawer.

3. In the animal cage as set forth in claim 2 wherein the inner slidable drawer comprises two side walls, a front wall and a rear wall.

References Cited in the file of this patent
UNITED STATES PATENTS 1,771,492    Karlson _____ July 29, 1930